March 31, 1931.  R. VYDRA  1,798,991
ARTIFICIAL TREE
Filed Jan. 3, 1929
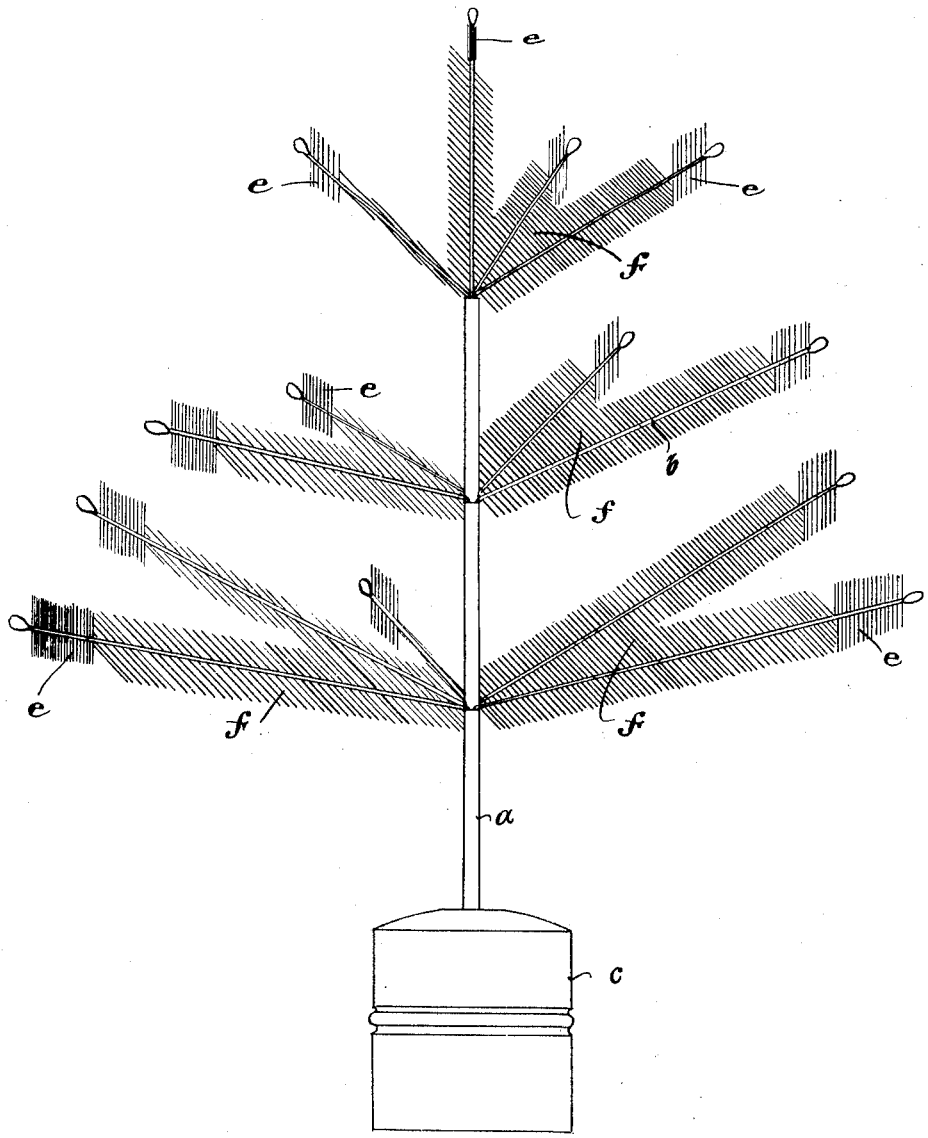
Inventor:
Robert Vydra Patented Mar. 31, 1931

1,798,991

UNITED STATES PATENT OFFICE

ROBERT VYDRA, OF NUREMBERG, GERMANY

ARTIFICIAL TREE

Application filed January 3, 1929, Serial No. 330,070, and in Germany November 7, 1928.

My present invention relates to artificial trees of any kind as the well-known Christmas-trees, fancy- or decorative-trees. According to my invention such trees are manufactured in such a manner that the several branches with their needles carried thereon have the appearance in different colours, whereby a distinct animation in the effect of the tree is obtained.

It is obvious, that various changes in the material used for manufacturing the trees may be resorted to without in any way departing from the principle of my present invention. For example the trees may be made of any material or stuff, such as coloured feathers, paper, straw, imitation silk or woody fibres.

In the accompanying drawing is illustrated by way of example a form of my invention in a side view without defining its limits.

Referring to the drawing the illustration shows an artificial Christmas-tree which consists of a stem $a$ carrying the branches $b$ with the needles thereon. The stem $a$ of the tree is positioned in a socket $c$. According to my invention each branch of the tree shows two different colours and is manufactured in such a manner that for example the outer one part of each branch towards the point is made in red colour, whilst the inner one directed towards the stem $a$ shows a green colouring. The portions thus illustrating are shown in the figure by the different depths of shading whereby the outer one part of each branch towards the point in red colour is designated by $e$ and the inner one directed towards the stem in green colour by $f$. Considering the tree coloured according to my invention it is obvious that in employing a different colouring for each branch of the tree an especial effect is obtained so giving the tree a distinct animation in its appearance.

I claim:

An artificial tree comprising several branches, needles thereon the outer one part of each branch towards the point being made in red colour, the inner one towards the stem being made in green colour.

In testimony whereof I affix my signature.

ROBERT VYDRA.